United States Patent [19]

Hecketsweiler et al.

[11] 4,196,804

[45] Apr. 8, 1980

[54] BELT TIGHTENER FOR SPIRAL CONVEYOR BELT

[75] Inventors: Herbert G. Hecketsweiler, Florence; Bill R. Burford, Canon City, both of Colo.

[73] Assignee: Portec, Inc., Oak Brook, Ill.

[21] Appl. No.: 921,440

[22] Filed: Jul. 3, 1978

[51] Int. Cl.² ............................................. B65G 23/44
[52] U.S. Cl. ................................... 198/813; 198/778
[58] Field of Search ............... 198/813, 814, 815, 831, 198/778, 816, 329; 74/242.1 A

[56] References Cited

U.S. PATENT DOCUMENTS

| | | | |
|---|---|---|---|
| 1,497,619 | 6/1924 | Waechter et al. | 198/813 |
| 1,803,186 | 4/1931 | Hendrickson | 74/242.1 A |
| 2,267,970 | 12/1941 | Boal | 198/778 |
| 3,100,565 | 8/1963 | Fry | 198/831 X |

Primary Examiner—Bruce H. Stoner, Jr.
Assistant Examiner—Douglas D. Watts
Attorney, Agent, or Firm—Frank C. Lowe

[57] ABSTRACT

A spiral conveyor belt is mounted between an inner cylindrical wall and a concentric outer cylindrical wall wherein the belt is formed of curved segments having an upper reach resting upon a spiralled slide plate and a lower under reach suspended therebelow, rollers at the top and at the base of the spiral about which the belt turns and means to drive the roller and belt connected thereto. The improvement is a belt tightener comprising a pair of spaced holding rollers engaging the under reach of the belt at one side thereof, a takeup roller mounted between the holding rollers at the opposite side of the belt and means to adjustably shift the takeup roller against the belt to move it between the holding rollers for taking up slack in the belt.

5 Claims, 10 Drawing Figures

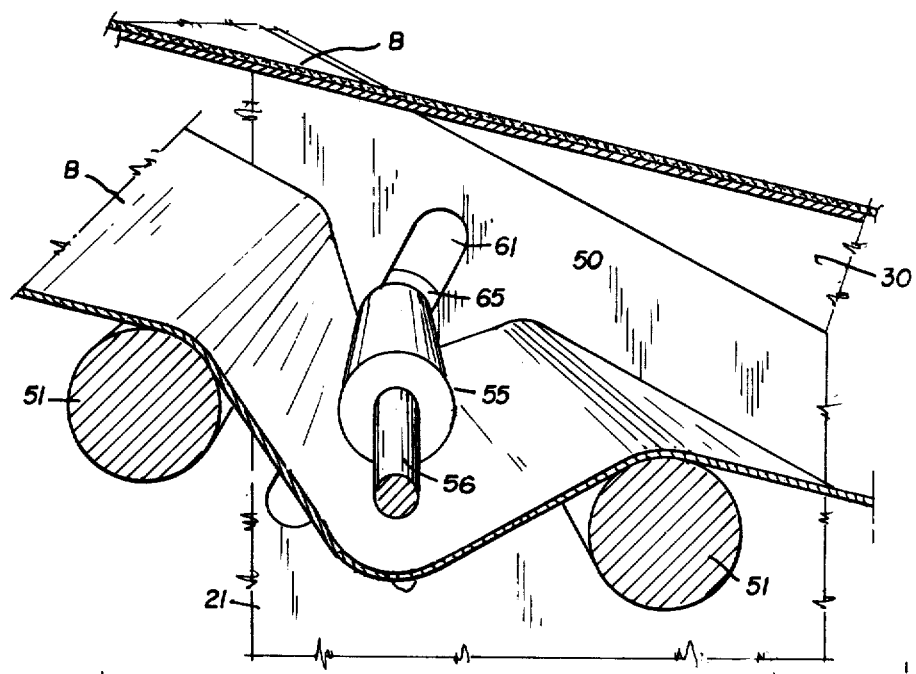
Fig. 8
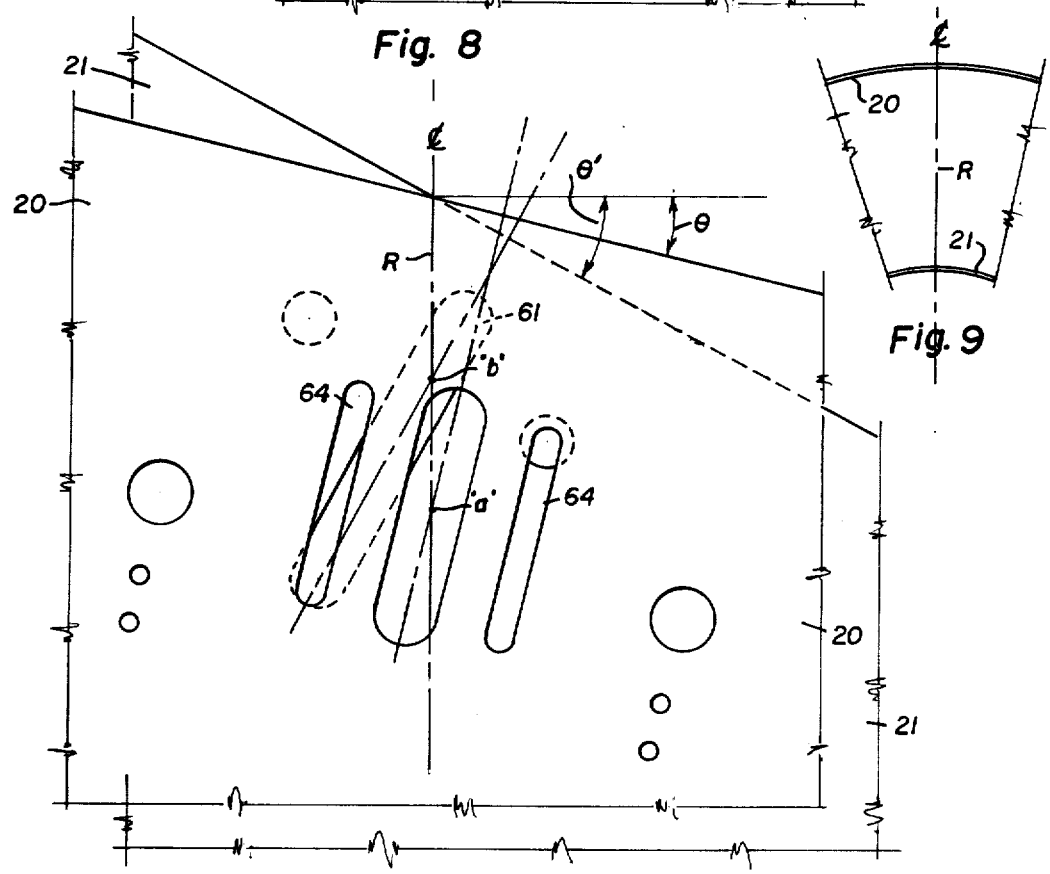
Fig. 9
Fig. 10

BELT TIGHTENER FOR SPIRAL CONVEYOR BELT

BELT TIGHTENER FOR SPIRAL CONVEYOR BELT

The present invention relates to improvements in spiral conveyor belts, and more paricularly to an improved construction of a belt tightener for a spiral conveyor belt.

The basic construction of a spiral conveyor belt is similar to the conveyor belt turn disclosed in the U.S. Pat. No. to Charles L. Fry, 3,044,603, issued July 17, 1962, although that unit is flat and not spiralled. The conveyor belt of a flat turn is essentially a continuous, curved flexible web having an upper surface in a horizontal plane. The belt moves around this upper surface of the turn and to an end roller. It turns about the roller to a lower surface, to move around this lower surface to an opposite end roller and thence about the roller to the upper surface. The end rollers are conical to match the curved belt with the conical roller surfaces apexing at the axis of the turn. A curved slide surface supports the upper surface of the belt and suitable roller wheels support the lower surface of the belt. The belt is held in place by a doubly flexible chain secured to its outer edge and the chain is restrained in guide tracks. The chain also moves about sprockets on the shafts of the end rollers. A suitable drive mechanism is associated with one or both end rollers.

Adjustments, and especially the adjustments to tighten the conveyor belt turn, are effected by placing the bearings of an end roller, at each side of the end roller, in horizontal slots. Take-up screws or the like permit the end roller to be shifted radially to keep the roller axis in a proper radial alignment as the belt is tightened.

Because of the success of this flat conveyor belt turn, a spiral conveyor was proposed to combine the turning of the belt with a changing of elevation between the end rollers. Although some changes in the geometry of the turn were necessary to make it into a spiral, a number of the features were essentially the same as those of the flat conveyor belt turn. A significant difference resided in the fact that the rotational turn of the spiral conveyor belt could exceed 180° and even exceed 360°, while the rotational turn of a flat conveyor belt was usually 90° and not more than 180°. The spiral conveyor belts functioned essentially the same as the flat conveyor belt turns, but after these spiral units were operated for a period of time, it was discovered that the longitudinal belt take-up system used with flat turns would not function properly and adjustments to keep the turn operative after wear and stretching occurred were very difficult to make.

The present invention was conceived and developed with the foregoing and other considerations in view, and the invention comprises, in essence, a belt tightener for a spiral conveyor belt which is fitted to the lower return reach of the conveyor. The tightener is formed by an offset roller between a pair of holding rollers and adjustments are effected by moving the offset roller between the holding rollers to increase the length of the path through which the belt must move. As such, this arrangement is analogous to an offset roller between holding rollers in a straight-course belt conveyor, but with the offset roller and the holding rollers being conical instead of cylindrical to conform with the geometry of the turn. Such an arrangement of an offset roller between holding rollers is also used on a flat conveyor belt turn. It was found, however, that the belt tightener of this type would not function properly in a spiral conveyor belt unless the adjustment slots, at the inner and outer side walls of the turn, to adjust the offset roller, were angled with respect to each other and normal to the pitch of the spiral of the respective walls, as will hereinafter be set forth in detail.

It follows that the objects of the invention are to provide a novel and improved belt tightener for a spiral conveyor belt which is an economical, simple and easily-built unit; is reliable and easily adjusted; is precise in holding the belt in position and is rugged, durable and requires a minimum of maintenance.

With the foregoing and other objects in view, all of which more fully hereinafter appear, my invention comprises certain constructions, combinations and arrangements of parts and elements hereinafter described, defined in the appended claims and illustrated in preferred embodiment in the accompanying drawings in which:

FIG. 8 is a fragmentary sectional detail as taken from the indicated line 8—8 at FIG. 5 but on an enlarged scale.

FIG. 9 is a plan view of a fragment of the spiral illustrating symbolically the radial centerline at the belt takeup.

FIG. 10 is a fragmentary elevational view of the inner and outer wall portions of the spiral at the belt takeup centerline of FIG. 9 showing specifically the locations of the adjustment slots for the belt takeup at the inner and outer walls of the unit.

Figure 1:
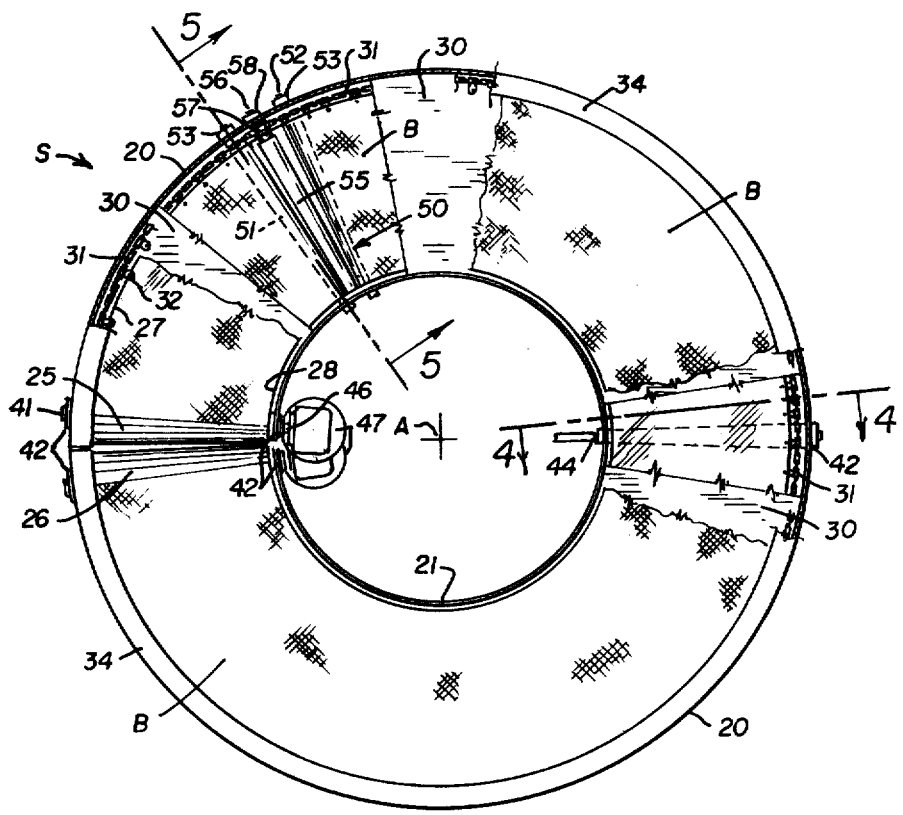
FIG. 1 is a plan view of a 360° spiral conveyor which incorporates therein the present invention, a belt take-up, with portions of the conveyor being broken away to better illustrate the same.
Figure 2:
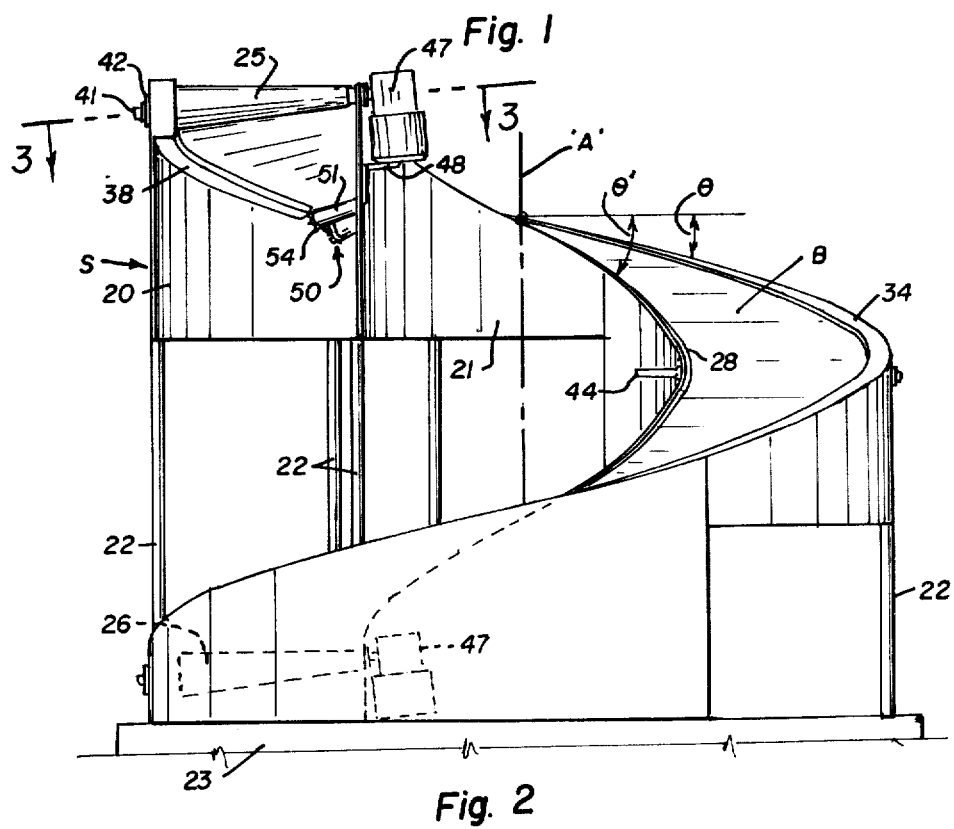
FIG. 2 is an elevation view of the conveyor shown at FIG. 1 with outlines of the conveyor behind other portions being shown in dotted lines.
Figure 3:
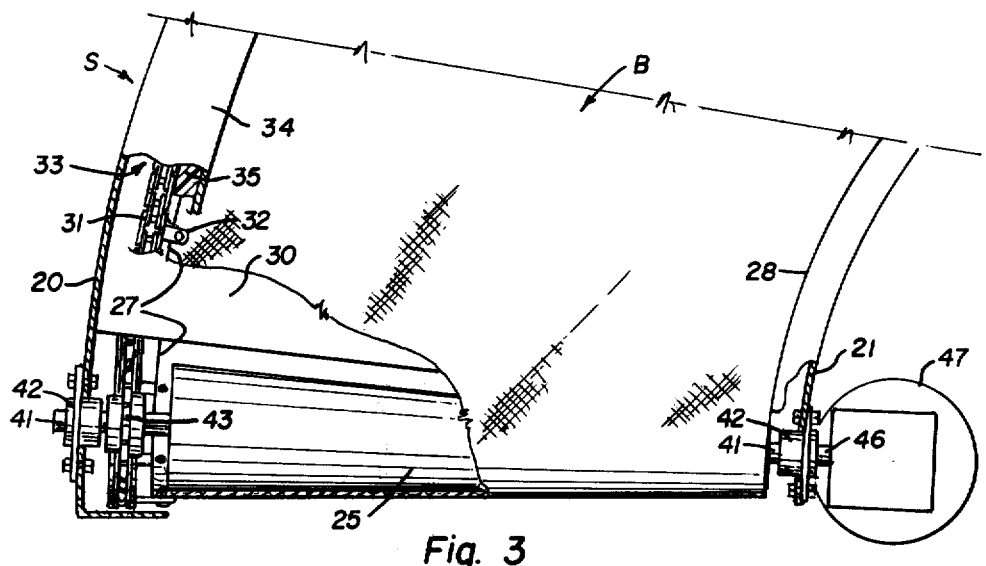
FIG. 3 is a fragmentary sectional view of the top of the conveyor as from the indicated line 3—3 at FIG. 2, and with portions broken away and in section to show parts otherwise hidden from view.

As heretofore mentioned, the improved spiral conveyor belt has a basic structure essentially the same as the conveyor belt turn disclosed in the U.S. Pat. No. 3,044,603. However, in a spiral conveyor belt, where the belt surface changes elevation as it curves about a central vertical axis, the angle of the turn may exceed 180°, may be 360° as illustrated at FIGS. 1 and 2, or even more. A turn of 720° is desirable at some installations and there is really no limit to the angle of turn which is possible.

Referring more particularly to the drawing, the spiral conveyor belt S, illustrated as a 360° unit, is formed within a framework which includes an outer cylindrical wall 20 and an inner, concentric cylindrical wall 21. The spiralled conveyor belt B is extended between these walls and the walls and the belt are centered about a common central vertical axis A. The wall members are illustrated as being three 120° segments with the upper segments being supported upon posts 22 and the lower segment being supported upon a base 23. Stiffeners, spacers and stabilizer struts which are necessary to hold the walls 20 and 21 rigidly in position are not shown since their arrangement will depend upon the designer of the unit. Also, other components, such as an outer spiralled fence above the belt surface are not shown although the same may be desired.

The belt B is necessarily formed as interconnected curved portions of flexible material. This belt will extend from an upper end roller 25, thence along a spiralled upper surface path between the outer and inner cylindrical walls 20 and 21 to a lower end roller 26, thence about the lower roller 26, along a spiralled under-surface path and to and about the upper end roller 25 to complete the belt. Viewed in plan, FIG. 1, the outer edge 27 of the belt B lies in a circle close to the outer cylindrical wall 20 and the inner edge 28 of the belt B lies in a circle close to the inner cylindrical wall 21. It is to be noted that the radii of the curved belt portions are not the same as the radii viewed in plan at FIG. 1, but is increased by the relation $1/\cos\theta$, where $\theta$ is the pitch of the spiral from the horizontal.

To define the spiral path and to support articles carried upon the belt B, the upper surface of the belt is supported upon a spiralled slide plate 30 extended between the outer and inner cylindrical walls 20 and 21. Referring to FIG. 2, it is to be noted that the pitch $\theta'$ of the spiral at the inner cylindrical wall 21 is steeper than the pitch $\theta$ at the outer cylindrical wall 20. Also, that this slide plate 30 is so formed that any element line projected from the surface of the spiral to the central vertical axis A is normal to that axis, providing for a uniform spiralled path. The belt pitch $\theta$ will be selected to permit the spiral from the upper roller to the lower roller to drop a selected distance, provided however, that the pitch is not so steep as to permit articles on the belt surface to slide down the spiral.

Figure 4:
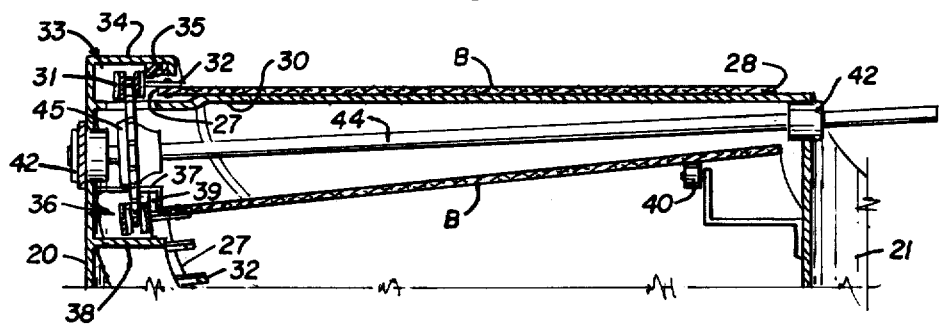
FIG. 4 is a sectional elevational detail as taken from the indicated line 4—4 at FIG. 1, but on an enlarged scale.

To hold this belt in position and prevent it from creeping inwardly towards the inner wall 21, a doubly flexible guide chain 31 is linked to the outer periphery of the belt by connector arms 32. This guide chain is held in a restraining slot 33 formed by an overhanging lip 34 at the outer cylindrical wall 20 above the slide plate 30. An anti-friction block 35 within the embrace of this lip bears against the chain 31 to permit it to slide freely along the spiralled path. A corresponding restraining slot 36 for the under reach of the belt is provided at the outer wall 20 below the slide plate 30. This slot 36 consists of an overhanging lip 37 and a shelf 38 below the lip. An anti-friction block 39 within the embrace of the lip 37 bears against the chain 31 to permit it to slide freely along its spiralled path and to support the under surface reach of the belt. This lower reach of the belt is also supported by support wheels 40, cantilevered from walls 20 and 21 as shown at FIG. 4.

The upper roller 25, the lower roller 26 and belt tightener rollers hereinafter described are necessarily conical in form with projected surface elements of each normally apexing at the central vertical axis A to conform with the spiral belt geometry. The upper roller 25 and the lower roller 26 are each carried upon a shaft 41 with the ends of each shaft being supported in bearings 42 in the walls 20 and 21.

Each shaft 41, of the upper roller 25 and the lower roller 26, carries a sprocket 43 about which the guide chain 31 extends, with the pitch diameter of the sprocket matching the effective conical surface of the roller to permit the belt and chain to move in unison about the roller and sprocket, respectively. There may also be included an intermediate drive shaft 44, mounted in bearings 42 which carries a sprocket 45 to engage the upper reach of the chain 31 as shown at FIG. 4.

To complete the general arrangement above described, a suitable drive mechanism is provided to move the belt about the spiralled path. The shaft 41 of one or both end rollers may be extended inwardly from the inner cylindrical wall 21 as a stub 46 to connect with a suitable motor-reducer unit 47. Each unit 47 is mounted upon the inner wall 21 as upon a suitable bracket 48. If two motor reducer units are used, each motor-reducer unit is preferably a torque-controlled type to assure uniform belt movement. Where a spiral of several revolutions is used, it may be necessary to provide an additional driving unit 47 as upon the intermediate drive shaft 44.

Figure 5:
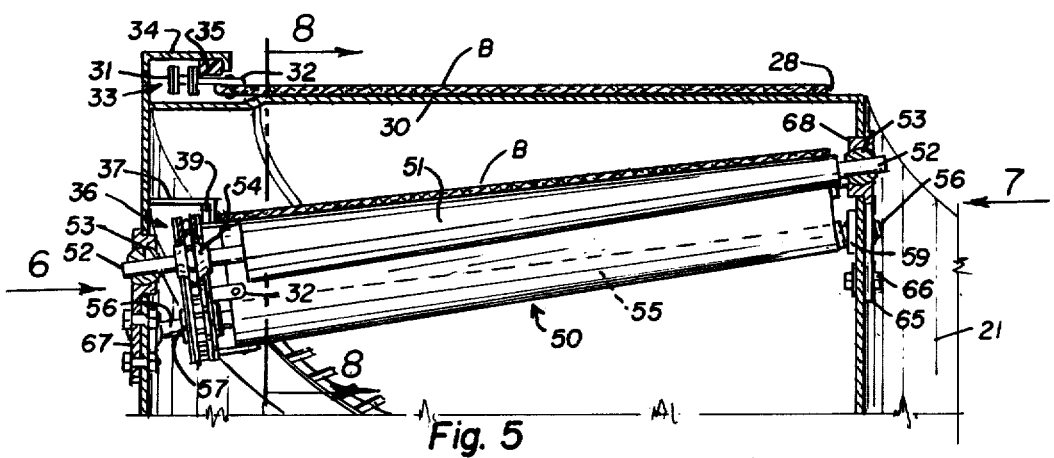
FIG. 5 is a sectional elevational detail as taken from the indicated line 5—5 at FIG. 1 but on an enlarged scale to illustrate the improved belt takeup.

The improved belt tightener 50 is necessarily at the under reach of the belt; however, its location is optional. It is illustrated as being near the top of the spiral at FIGS. 1 and 2, a suitable location. It is to be noted that the lower restraining slot 36 which holds the guide chain 31 is removed at the location of the belt tightener 50 since the chain will move about sprockets on this belt tightener 50 as will be described. This belt tightener includes two spaced conical holding rollers 51 which are mounted at the underside of the belt B upon shafts 52 supported in bearings 53 in the outer and inner walls 20 and 21. A sprocket 54 having a pitch diameter properly corresponding with the roller diameter is mounted on each shaft 52 to carry the guide chain 31. Each sprocket 54 is mounted upon its shaft 52 as an idler sprocket, free to rotate upon the shaft 52. Accordingly, each sprocket 54 is carried upon the shaft 52 on a suitable bearing. This is to permit the sprocket to adjust itself to the chain without creating undue stresses when the belt is moving through the belt tightener 50. It is to be noted that although these holding rollers are conical and are axially directed to the central vertical axis A of the spiral conveyor belts, they are inclined upwardly towards this central axis to match the normal tip of the lower reach of the belt as illustrated at FIG. 5.

The spacing of the holding rollers 51 is such as to permit a takeup roll 55 to be placed between them at the top side of the belt, as illustrated. The takeup roll 55, conical in form as heretofore described, is mounted upon a shaft 56. A sprocket 57 having a pitch diameter properly corresponding with the roller diameter is mounted upon this shaft 56 to carry the guide chain 31. The shaft 56 is carried in bearings 58 and 59 at the outer and inner walls 20 and 21, respectively. These bearings are mounted in slots 60 and 61, FIGS. 6 and 7, respectively, to shift the roller 55 and the belt between the holding rollers as best shown at FIG. 8. In some instances, the chain and belt stretch were not always compatible when moving through the belt tightener 50 and stresses would build up on the belt. It was found that the length of the takeup roll 55 could be reduced to half, or less than the belt width, with the remaining portion being at the small end of the roll as best shown at FIG. 8.

Figure 6:
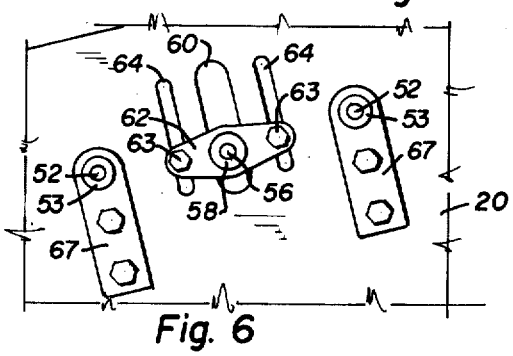
FIG. 6 is a fragmentary detail view showing the outer bearing mount arrangement of the takeup as from the indicated arrow 6 at FIG. 5.
Figure 7:
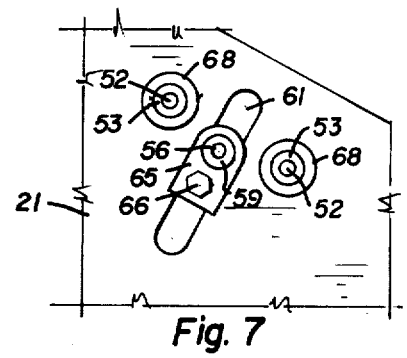
FIG. 7 is a fragmentary detail view the inner bearing mount arrangement of the takeup as from the indicated arrow 7 at FIG. 5.

The bearing 58 at the outer wall 20 is carried in a housing 62 having opposing wings with mounting holes for bolts 63 to fit in holding slots 64 which parallel the slot 60. This arrangement will securely hold the bearing in position in the slot 60 when the tightened belt pulls against the roller 55. The bearing 59 is carried in a housing 65 which is adjustably secured in the slot 61 by a bolt 66 to clamp it in place when the tightened belt pulls against the roller 55. The bearings 53 of the holding rollers are mounted in suitable bearing housings 67 and 68, in the walls 20 and 21, which may be affixed to the respective walls by bolting or by welding as shown at FIGS. 6 and 7.

The key to proper belt adjustment of the spiral belt was found to be the comparative inclinations of the slot 60 in the outer wall 20 and the slot 61 in the inner wall 21 through which the ends of the shaft 56 of the takeup roller 55 extend. It was found that these slots should be anlged with respect to each other for proper operation of the belt and that the respective slots 60 and 61 should be normal to the pitch $\theta$ and $\theta'$ of the spiral at the walls 20 and 21. As heretofore mentioned, this pitch $\theta'$ of the spiral at the inside wall 21 was steeper than the pitch $\theta$ of the spiral at the outside wall. The slots are located at a common radial plane R from the central vertical axis a. The plane R being indicated as a center line shown at FIG. 9 and the slot arrangement can be best illustrated at FIG. 10 where the plane R is also indicated as a line. The axis of each slot 60 and 61 is normal to the respective pitch $\theta$ and $\theta'$ and the intersection of each slot centerline with the radial plane R is at a selected roller position, with the intersection point 'a' of the outer slot 60 being below the intersection point 'b' of the inner slot 61. When the takeup roller 55 is at an initial position with a minimum of belt takeup, the axis of the roller will pass through these points 'a' and 'b', at the slots 60 and 61, to rest evenly upon the belt.

I have now described my invention in considerable detail. However, it is obvious that others skilled in the art can build and devise alternate and equivalent constructions which are nevertheless within the spirit and scope of my invention. Hence, I desire that my protection be limited not by the constructions illustrated and described, but only by the proper scope of the appended claims.

What is claimed is:

1. In combination with a spiral conveyor belt mounted between an inner cylindrical wall and a concentric outer cylindrical wall wherein the belt is formed of curved segments having an upper reach resting upon a spiralled slide plate between the walls and a lower under reach suspended therebelow, rollers at the top and at the base of the spiral about which the belt turns, and means to drive the roller and belt connected thereto, a belt tightener at the under reach comprising:
   (a) a pair of spaced holding rollers engaging the under reach of the belt at one side thereof, said holding rollers being essentially conical frustums, with the projected apex thereof being at the common central axis of the aforesaid concentric cylindrical walls;
   (b) a takeup roller mounted between the holding rollers at the opposite side of the belt, said takeup roller being essentially a conical frustum with the projected apex thereof being at the common central axis of the aforesaid concentric cylindrical walls;
   (c) an axial shaft carrying the takeup roller;
   (d) a slot means in the inner cylindrical wall having an inner bearing means shiftably mounted therein, with the inward end of the axial shaft being carried on the inner bearing means;
   (e) a slot means in the outer cylindrical wall having an outer bearing means shiftably mounted therein, with the outward end of the axial shaft being carried in the outer bearing means, and wherein:
   (f) the slot at the inner cylindrical wall is inclined to be normal to the pitch of the inner edge of the spiralled conveyor belt and the slot at the outer cylindrical wall is inclined to be normal to the pitch of the outer edge of the spiralled conveyor belt.

2. In the organization defined in claim 1, wherein the conveyor belt includes:
   a doubly flexible chain at its outer periphery;
   a restraining guide means at the outer periphery of the spiral above the slide plate and therebelow holding both reaches of the chain in position as the belt moves about the spiralled paths;
   sprocket means on each end roller; and
   a sprocket means at the belt tightener holding and takeup rollers.

3. In the organization defined in claim 2, wherein the sprocket means on the holding rollers are idler sprockets adapted to turn freely with respect to the holding rollers.

4. In the organization defined in claim 2, wherein the takeup roller is substantially shorter than the width of the belt.

5. In the organization defined in claim 4, wherein the takeup roller is positioned adjacent to the inner circumference of the belt.

* * * * *